(12) United States Patent
Sailer (10) Patent No.: US 10,131,264 B2
(45) Date of Patent: Nov. 20, 2018

(54) HOOKLIFT TRAILER

(71) Applicant: Southland Trailer Corp., Lethbridge (CA)

(72) Inventor: Ryan Blair Sailer, Lethbridge (CA)

(73) Assignee: Southland Trailer Corp., Lethbridge (CA)

( * ) Notice: Subject to any disclaimer, the term of this patent is extended or adjusted under 35 U.S.C. 154(b) by 24 days.

(21) Appl. No.: 15/444,861

(22) Filed: Feb. 28, 2017

(65) Prior Publication Data

US 2018/0178704 A1 Jun. 28, 2018

(30) Foreign Application Priority Data

Dec. 22, 2016 (CA) ...................................... 2952502

(51) Int. Cl.
*B60P 1/64* (2006.01)

(52) U.S. Cl.
CPC ........... *B60P 1/6463* (2013.01); *B60P 1/6409* (2013.01)

(58) Field of Classification Search
CPC .............................. B60P 1/6409; B60P 1/6463
See application file for complete search history.

(56) References Cited

U.S. PATENT DOCUMENTS

| | | | | |
|---|---|---|---|---|
| 5,427,495 A * | 6/1995 | Vlaanderen | ............. | B60P 1/483 414/498 |
| 6,749,389 B1 * | 6/2004 | Vlaanderen | ........... | B60P 1/6463 414/491 |
| 7,341,419 B1 * | 3/2008 | Fink | ...................... | B60P 1/6463 414/448 |
| 2002/0127087 A1 * | 9/2002 | Bohata | .................... | B60P 1/483 414/546 |
| 2004/0136819 A1 * | 7/2004 | Hummel | ............... | B60P 1/6463 414/498 |
| 2004/0156703 A1 * | 8/2004 | Benedikt | ............... | B60P 1/6463 414/498 |
| 2007/0071586 A1 * | 3/2007 | Born | ...................... | B60P 1/6463 414/549 |
| 2007/0212205 A1 * | 9/2007 | Lowecki | ............... | B60P 1/6463 414/498 |
| 2007/0237617 A1 * | 10/2007 | Schroeder | ............. | B60P 1/6463 414/491 |
| 2007/0292250 A1 * | 12/2007 | Born | ...................... | B60P 1/483 414/467 |
| 2010/0086388 A1 * | 4/2010 | Guidry | .................. | B60P 1/6463 414/495 |

\* cited by examiner

*Primary Examiner* — Saul Rodriguez
*Assistant Examiner* — Ashley K Romano
(74) *Attorney, Agent, or Firm* — Moss & Barnett; Michael A. Bondi (57) ABSTRACT

A hooklift mounted on heavy duty trucks or trailers that allows for lifting, re-positioning, transporting, and unloading various containers. A hooklift assembly having a frame. A lift arm having lift linkages rotatably mounted at a hinge end to at least one position on the frame. A hook arm rotatably coupled at a hook end of the lift arm. The hook arm configured for loading or unloading a container from the frame. A hydraulic actuator coupled at one end to the frame and at the other end to the lift linkage. The hydraulic actuator simultaneously lifting the lift linkage from a storage position into an extended position and adjusting an angle between the hook arm and the lift linkage.

24 Claims, 11 Drawing Sheets

HOOKLIFT TRAILER

FIELD OF THE INVENTION

This invention is in the field of heavy-duty vehicle equipment, and more specifically to hooklifts.

BACKGROUND

Hooklifts, otherwise known as hooklift hoists, generally relate to equipment mounted on heavy duty trucks that allow hauliers in the truck cab to lift, re-position, transport, and unload or dump various pieces of heavy equipment. The lifted equipment is usually a tilt-frame body, pallet, flat rack, flatbed, bin, dumpster body, and other similar heavy containers. The containers that are changed out by the hooklift are often specialized containers used for the transportation of materials in various industries, and particularly in waste, recycling, snow removal, scrap, and demolition industries. Hydraulic hooklift hoist systems offer several advantages, including ground level loading and unloading, exact positioning in dropping off containers, ability to get in and out of tight spaces, quick exchange of containers, and complete in-cab operation.

To change out a container on a hooklift, the hooklift system typically employs a series of hydraulic rams to hook the container, and then subsequently lift and hoist the container onto the chassis of a heavy duty truck designed to operate the hooklift. The container is then secured onto the truck and transported to another location where the container can be dumped or unloaded and the hooklift is then free again to hoist and transport another body or container.

A hooklift system is generally made up of the heavy duty truck, a hydraulic system, a jib system, and a hook.

Lift and dump capacities of hydraulic hooklift hoists typically range from 8,000 to 68,000 pounds, which varies according to the properties of the truck chassis and the containers themselves. In achieving the desired load capacity, the ratio of container length to chassis length must be considered to determine the load angle. Hooklift hoist systems indicate a recommended range of body lengths, and container bodies that are shorter than the recommended length produce substantially steeper load angles, and consequently lower load rating, than those of the longest bodies intended for use with a particular hoist. The chassis frame height is also important, as the lower the chassis frame height, the lower the potential load angle. To achieve the optimal load capacity, a combination of low chassis with the longest recommended body length should be used. Additionally, the hook height has an effect on load capacity, as a taller hook height achieves a greater lift and dump capacity. The hydraulic operating pressure of hooklifts is preset to achieve the intended lifting capacity for the design application.

There are two common types of jib system, each controlled by a single hydraulic cylinder and which can be used with either a single or dual rear pivot section. An articulating jib, also referred to as a tilting jib, is a simple A-frame. When extending the cylinder, the container or body is pushed up and back, exiting the rear locks. When retracting the cylinder, the container or body is pulled forward and down, engaging the rear locks. On the other hand, a sliding or telescoping jib consists of a single arm composed of a tube within a tube. When extending the cylinder, the container or body is pulled forward, engaging the rear locks. When retracting the cylinder, the container or body is pushed rearward, exiting the rear locks.

Traditional hooklifts use two hydraulic cylinders to actuate the motion of the hooklift to move backwards and connect to the item it will pull onto the truck or trailer: the lift/dump cylinder and the tilt cylinder.

The lift/dump cylinder not only lifts the body or container onto the truck, but it also provides the dumping movement in unloading the container. There are also two typical configurations of the lift/dump cylinder. The single lift/dump cylinder design reduces unit cost, retains true hooklift capabilities, but can be unstable while dumping on uneven ground. On the other hand, the dual lift/dump cylinder design increases unit cost, but improves load handling stability when dumping on uneven ground. Dual counterbalance valves can provide for increased meter-ability and protection against sudden movement in the case of hose failure.

A tilt cylinder is also present to operate the tilt section of the hooklift. It is a key component of the hooklift as it provides the selection of dump or load/offload. It has both extend and retract sides to allow for this functionality.

This double hydraulic base system to control the rotational movement of the arm or jib and to reduce the load angle of any attachment is very expensive, particularly because it must be installed onto a truck chassis specific to the design specifications of the hooklift base system and the application for which it is used.

SUMMARY OF THE INVENTION

The present invention may allow for a double knuckle hooklift system that may simultaneously combine rotational motion and load angle minimization with a single hydraulic cylinder to be mounted on a trailer, rather than a truck chassis. The reduction of two hydraulic cylinders into a single cylinder may reduce weight and costs of the hooklift base, and may allow the hooklift base to be adaptable for use with various trucks, which do not have to be specific and adapted to the hooklift base system, thereby reducing costs of the entire system.

In one aspect, there is provided a hooklift assembly having a frame; a lift arm comprising a lift linkage. The lift linkage may rotatably mounted at a hinge end to at least one position on the frame. A hook arm may be rotatably coupled at a hook end of the lift arm. The hook arm may be configured for loading or unloading a container from the frame. A hydraulic actuator coupled at one end to the frame and at the other end to the lift linkage. The hydraulic actuator can simultaneously lift the lift linkage from a storage position into an extended position and adjusting an angle between the hook arm and the lift linkage.

In some aspects, the lift linkage comprises an outer boom, an inner boom, and at least one hinge member. In yet some more aspects, the outer boom and inner boom are parallel linear links. The outer boom is rotatably coupled to the frame at a hinge end of the outer boom using a first hinge. The hinge member is rotatably coupled at a hinge end to the frame using a second hinge and the hinge member is rotatably coupled at a hook end to a hinge end of the inner boom. The first hinge is space vertically above the second hinge. The first hinge is horizontally aligned with the second hinge. The outer boom is longer than the inner boom. A combined length of the hinge member and the inner boom is approximately equal to the outer boom length.

In yet another aspect, the angle between the hook arm and the lift linkage reaches a minimum angle when the lift linkage is perpendicular to the frame. A container coupling member is provided on an end of the hook arm configured attach to the container. A hook end of the outer boom is rotatably coupled to the hook arm and a hook end of the inner boom is rotatably coupled to the hook arm closer to a container coupling member that the hook end of the outer boom. The minimum angle is approximately 70-degrees. The angle between the hook arm and the lift linkage ranges between 70-degrees to 90-degrees.

In even yet another aspect, the angle between the hook arm and the lift linkage determines a maximum load angle for the container. The maximum load angle is between 5-degrees and 30-degrees from the frame.

In another aspect, a shape of the hinge member is selected from one of elliptical, diamond-shaped, kite-shaped, s-shaped, and a combination thereof. The hook portion comprises a container coupling member, the container coupling member configured for coupling to the container. The hook arm comprises a rectangular-shaped frame rotatably coupled to the hook end of the outer boom and the hook end of the inner boom. The hook arm further comprises a triangular frame coupled to the rectangular frame, wherein one side of the triangular frame shares at least a portion of one side of the rectangular frame. The container coupling member is located on a vertex of the triangular frame.

In yet another aspect, there may be at least two lift linkages, wherein the hinge members from each of the at least two lift linkages are coupled together by a cross member. The hydraulic actuator is coupled at the other end to the cross member in order to rotate the hinge members of the at least two lift linkages.

According to another aspect, at least one guide roller rotatably mounted on at least a rear of the trailer frame.

DESCRIPTION OF THE DRAWINGS

While the invention is claimed in the concluding portions hereof, example embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

With reference to FIGS. 1-11, a hooklift trailer 5 is provided that has an articulating lift arm 20 that may be pivoted and rotated through the use of a single hydraulic actuator 30 to lift a container 2 onto a trailer frame 14 for transport of the container 2 and its content to any location, and to unload the same therefrom, rather than using a lift/dump cylinder and separate tilt cylinder. A plurality of wheels 16 may be rotatably affixed on opposing sides of the trailer frame 14. The wheels 16 may be covered by wheel wells 18. The hooklift trailer 5 may have one or more couplers 80 for coupling to a trailer hitch (not shown). The coupler 80 may be located proximate to an end of the trailer frame 14 opposite to where the plurality of wheels 16 may be affixed. The trailer frame 14 may be releasably connected by way of the coupler 80 and trailer hitch to any sort of vehicle, including heavy duty trucks that may pull the hooklift assembly 10 to a desired location.

FIGS. 1-5 and 7 illustrate a hooklift assembly 10 mounted on a trailer frame 14 in an aspect while FIGS. 6 and 8-11 shows the hooklift assembly 10 not mounted on the trailer frame 14 for improved visibility of the hooklift assembly 10. Hooklift assembly 10 may comprise a hooklift sub-frame 12, a lift arm 20, a hook arm 24, and a hydraulic actuator 30.

The hooklift sub-frame 12 may be fixedly, rotatably, or removably secured to the trailer frame 14. In this aspect, the sub-frame 12 may be rotatably secured to the trailer frame 14 by way of at least one sub-frame hinge 84 having a lockable pin that passes through a corresponding hole or bracket in the trailer frame 14. The sub-frame hinge 84 may also allow removal of the lockable pin enabling the sub-frame 12 to be completely removed from the trailer frame 14. In this aspect, the sub-frame 12 may have a hook end 13 and a pivot end 15. The hook end 13 may generally be located at the front of the trailer frame 14 (e.g. where the coupler 80 may be located) and the pivot end 15 may be located at the back of the trailer frame 14 (e.g. where the wheels 16 may be located).

Figure 1:
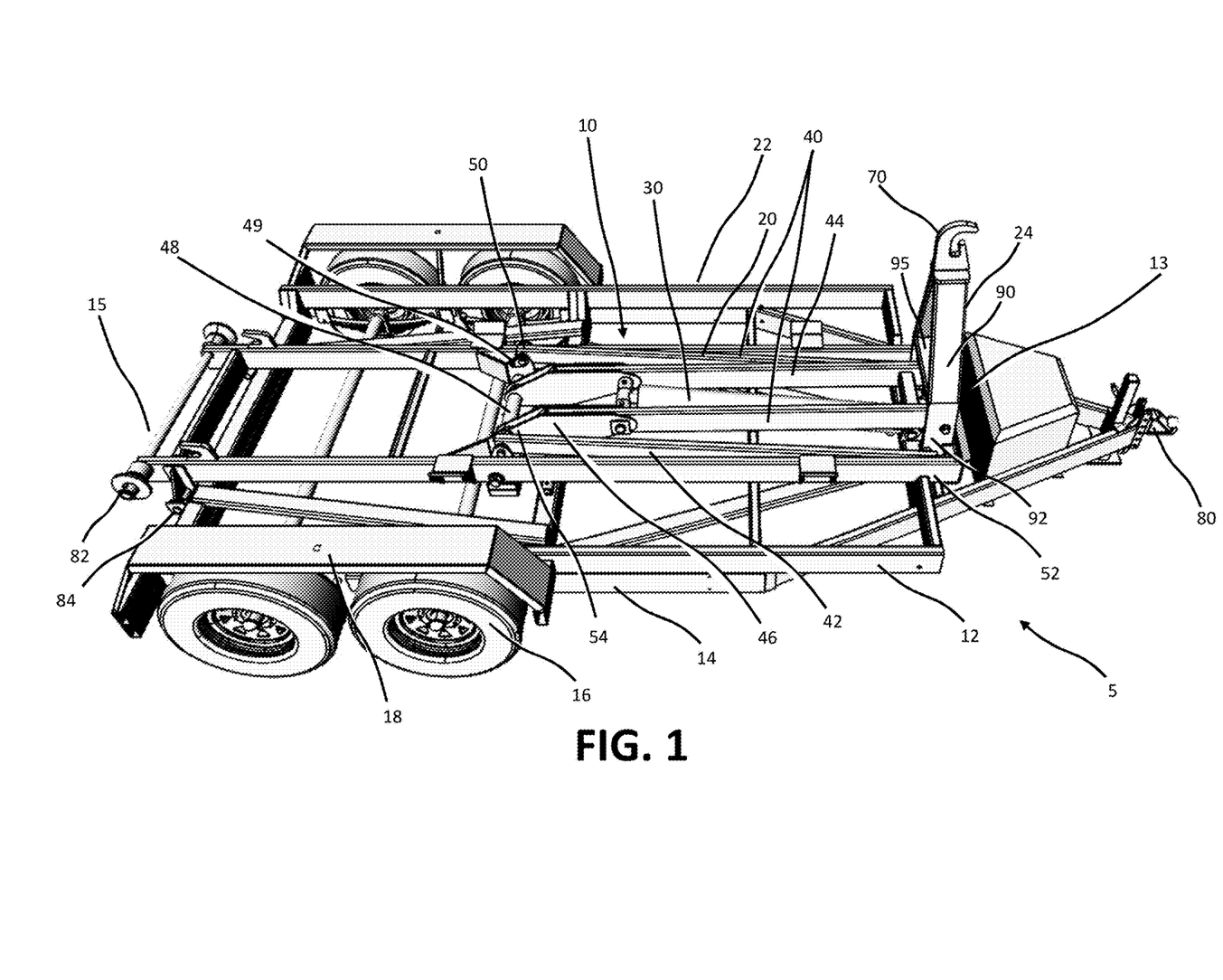
FIG. 1 is a perspective side view of a hooklift trailer in a retracted transport position.
Figure 2:
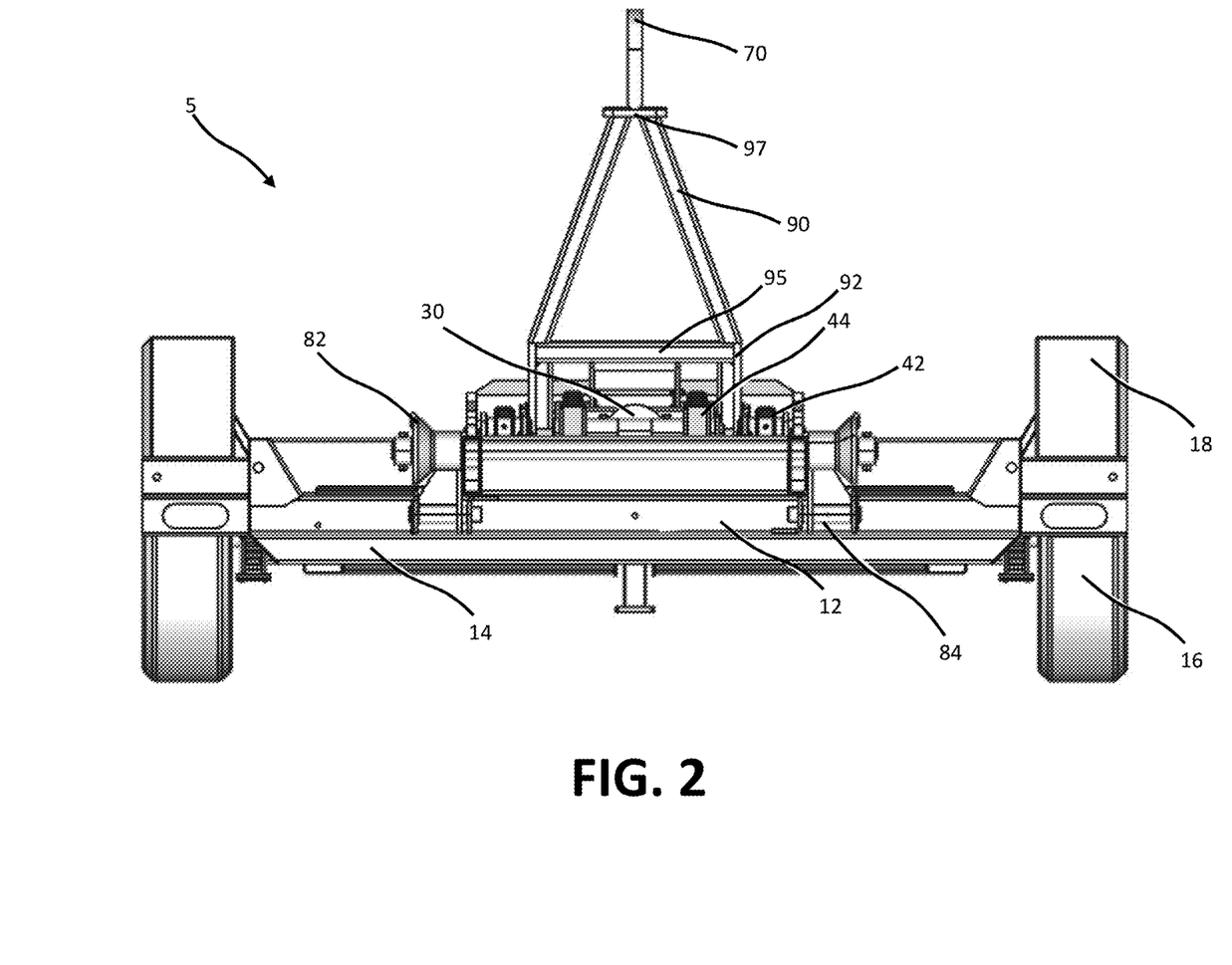
FIG. 2 is an orthographic rear view of the hooklift trailer shown in FIG. 1 in a retracted transport position.
Figure 3:
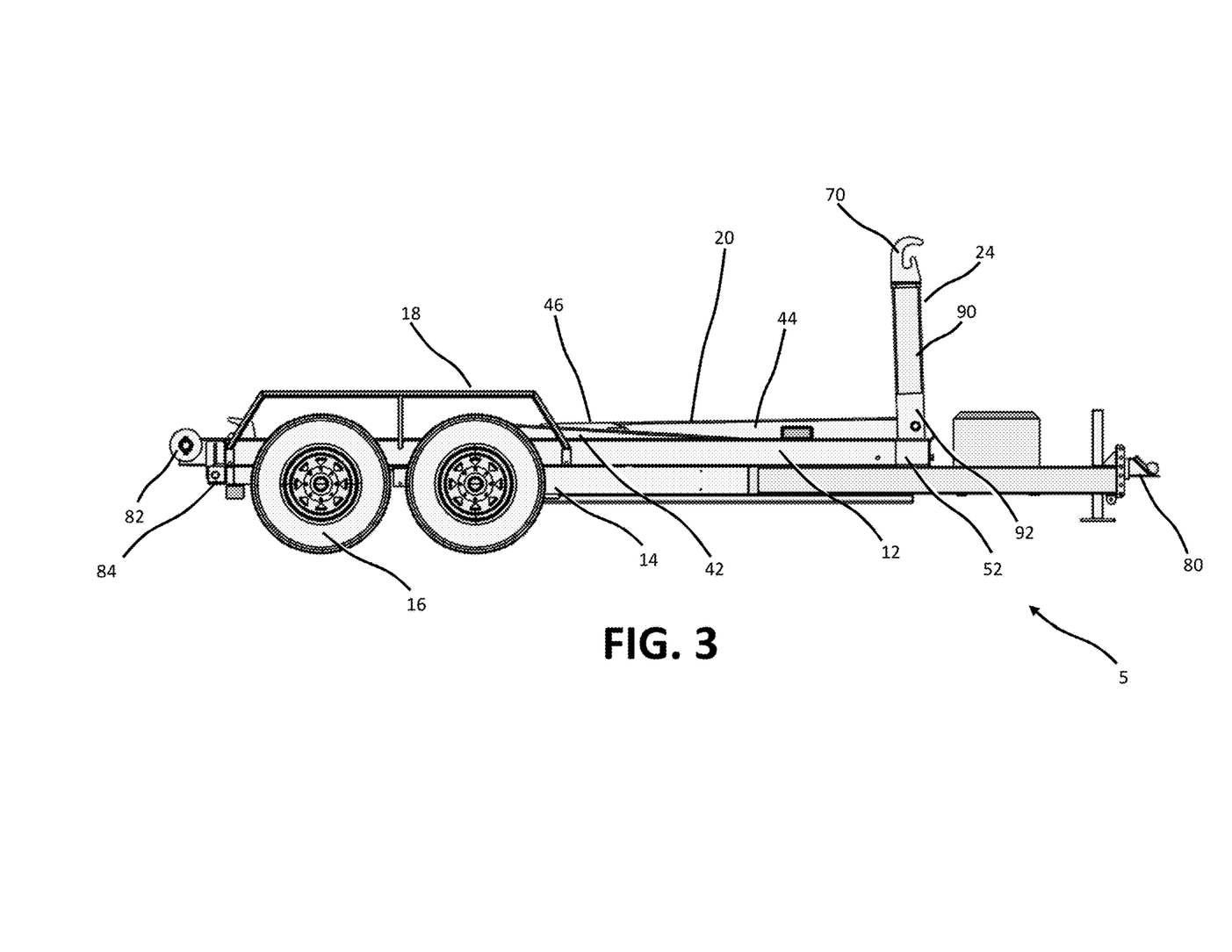
FIG. 3 is an orthographic side view of the hooklift trailer shown in FIG. 1 in a retracted transport position.
Figure 4:
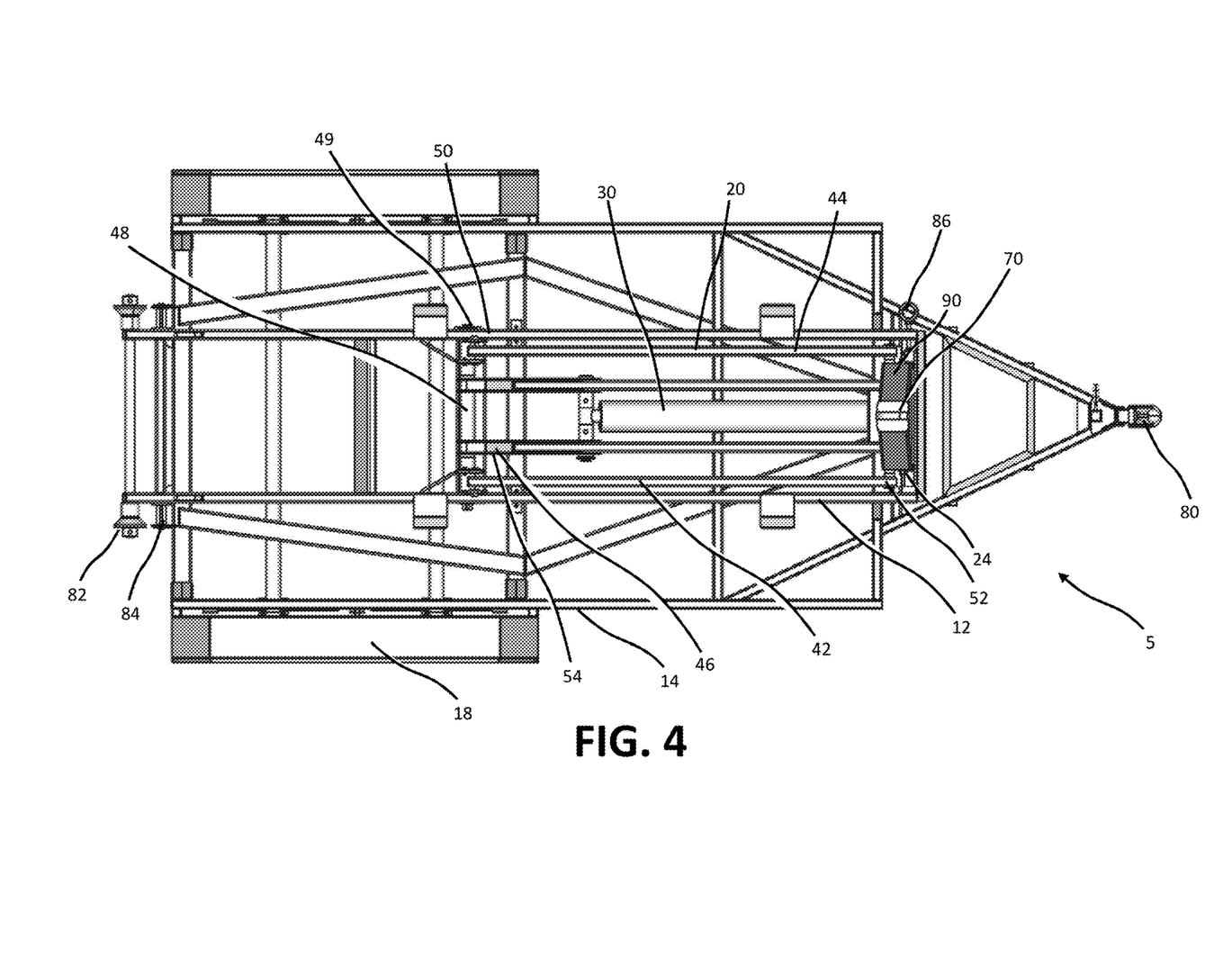
FIG. 4 is an orthographic top view of the hooklift trailer shown in FIG. 1 in a retracted transport position.
Figure 5:
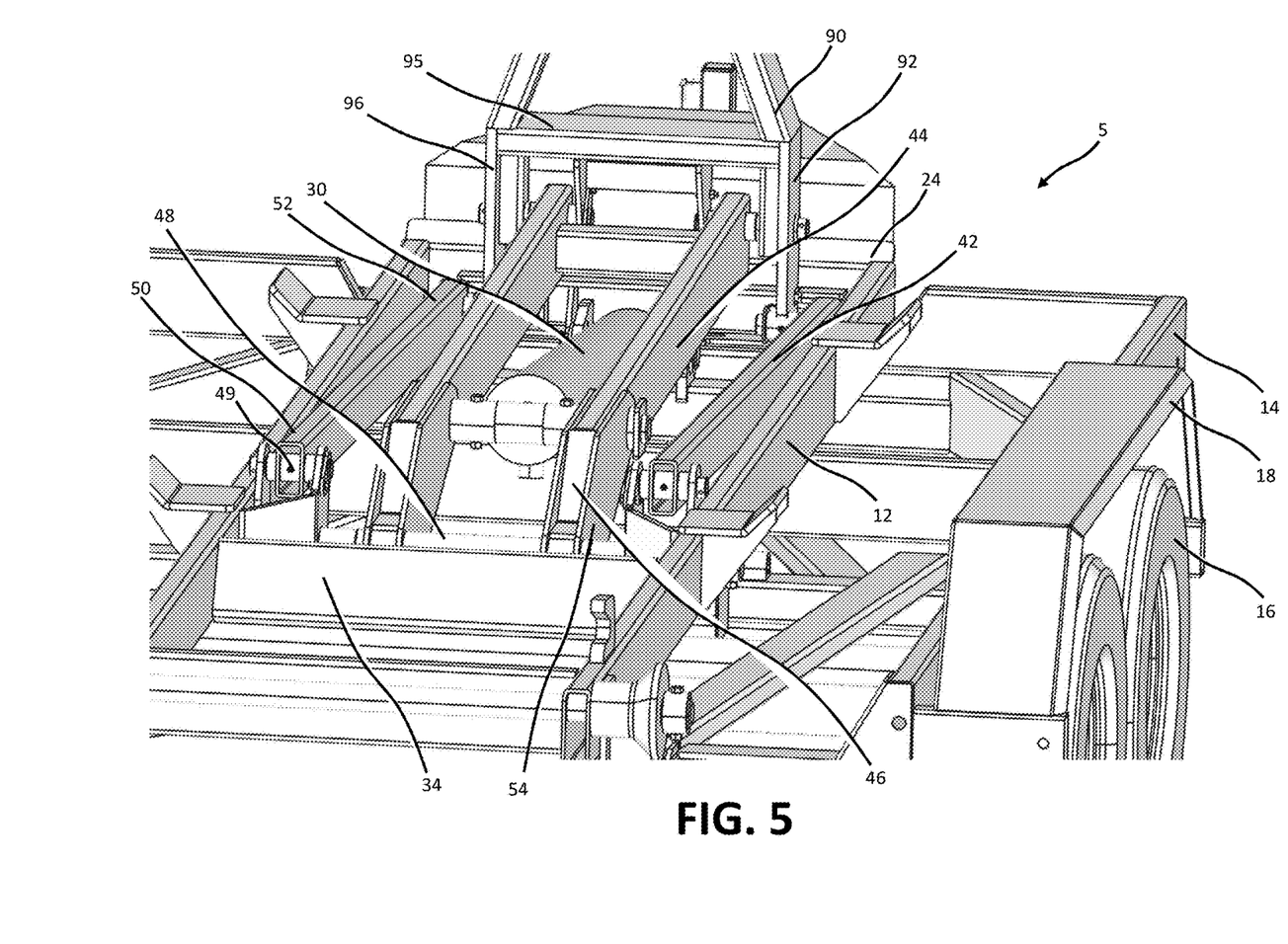
FIG. 5 is an enlarged perspective rear view of the hooklift trailer shown in FIG. 1 in a retracted transport position.
Figure 6:
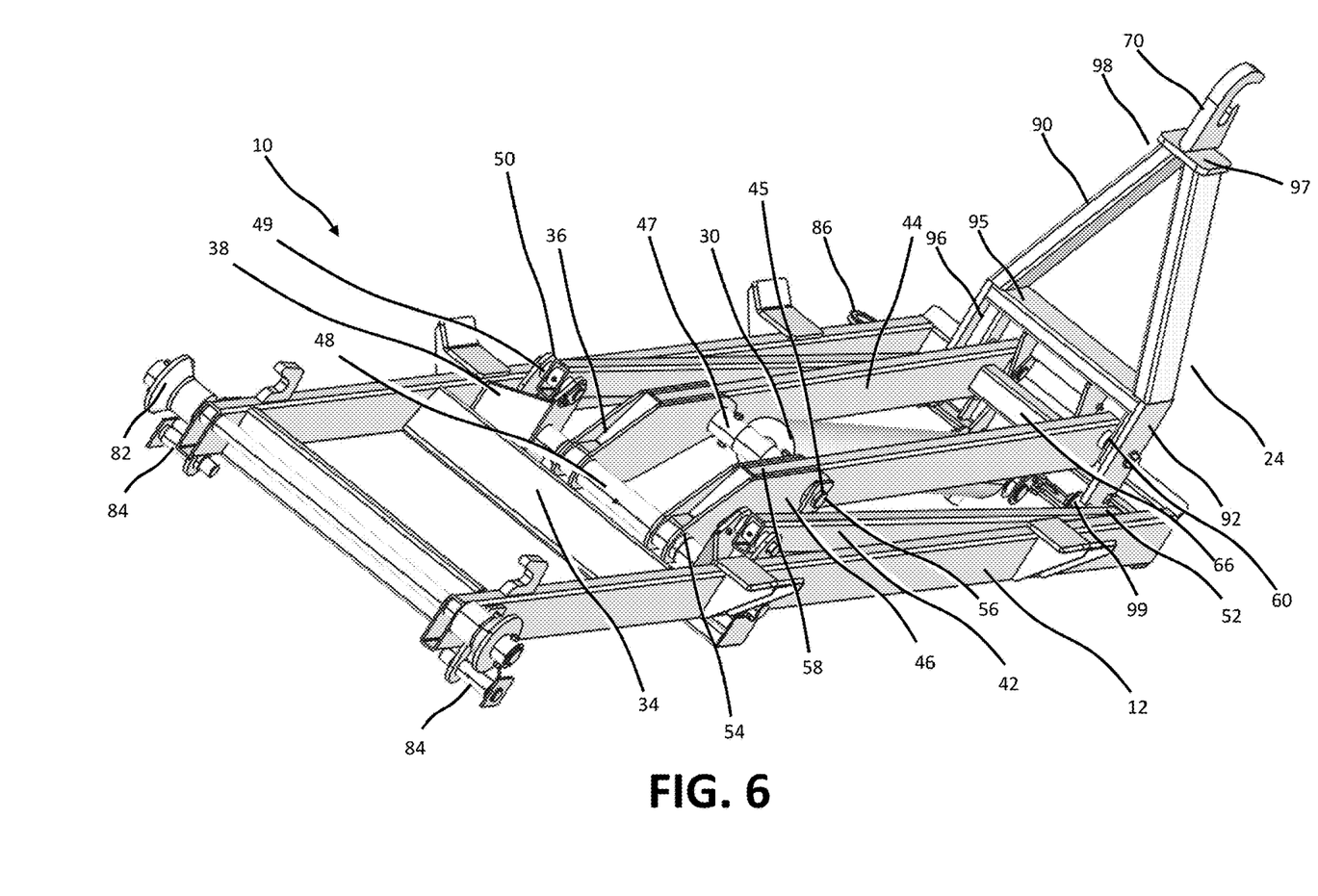
FIG. 6 is a perspective rear view of the lift arm used in the hooklift trailer shown in FIG. 1 without the trailer.

The front of the sub-frame 12 may be secured to the trailer frame 14 in order to prevent the sub-frame 12 from rotating using a sub-frame lock 86, more clearly visible in FIGS. 4 and 6. When the sub-frame lock 86 is unlocked, the entire sub-frame 12 may be lifted to facilitate a dump-truck mode. Dump-truck mode enables the contents of the container 2 to be poured from the back of the container 2. In some aspects, the sub-frame lock 86 may also be configured to lock the lift arm 20 in a storage position to the sub-frame 12 when the sub-frame 12 is unlocked from the trailer frame 14. When the sub-frame 12 may be locked to the trailer frame 14, the sub-frame 12 may act as a foundation for the lift arm 20.

Figure 7:
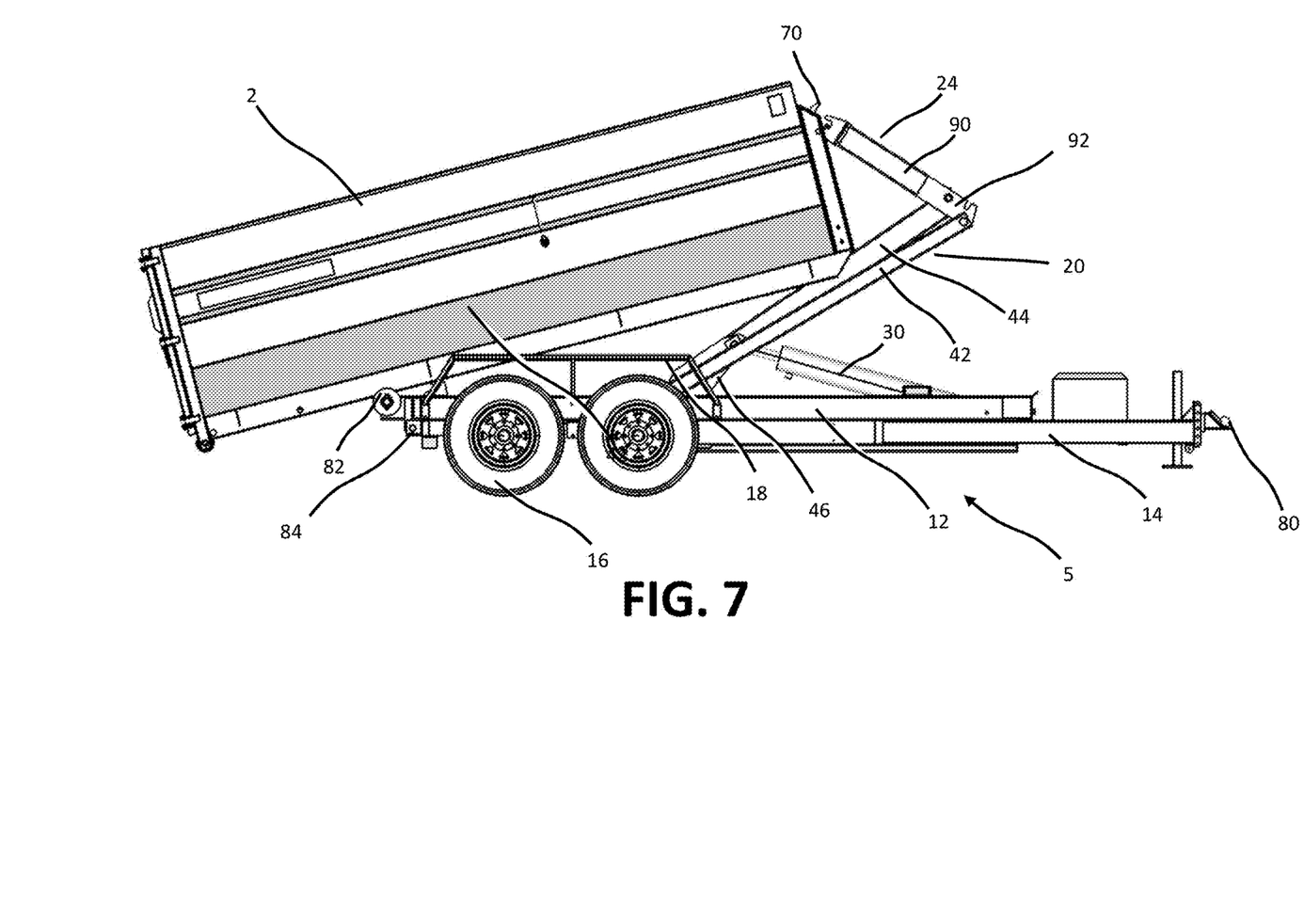
FIG. 7 is an orthographic side view of the hooklift trailer shown in FIG. 1 in a partially loading/unloading position.
Figure 8:
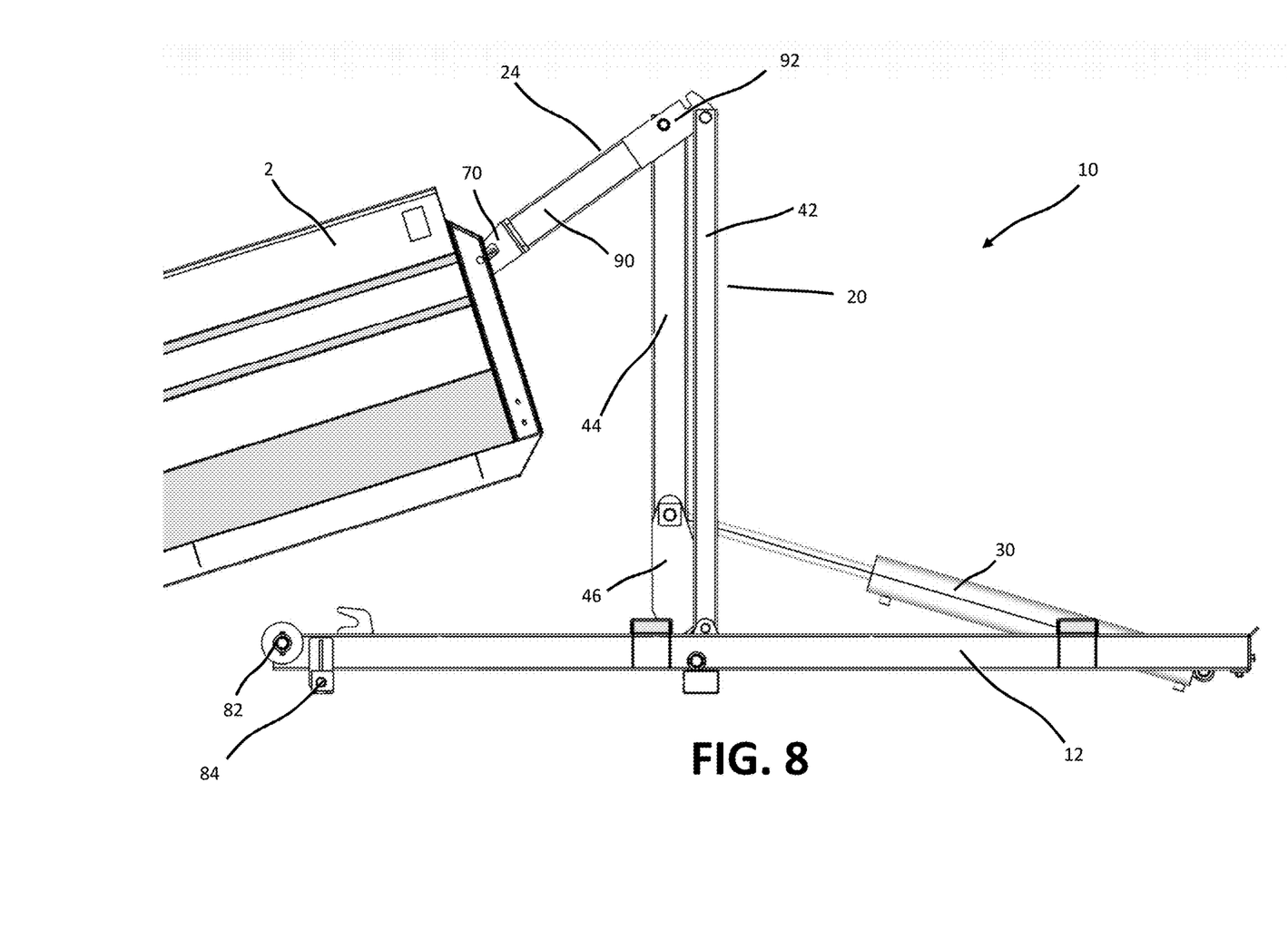
FIG. 8 is an enlarged orthographic side view of the hooklift trailer shown in FIG. 1 with the lift arm in a vertical position.
Figure 9:
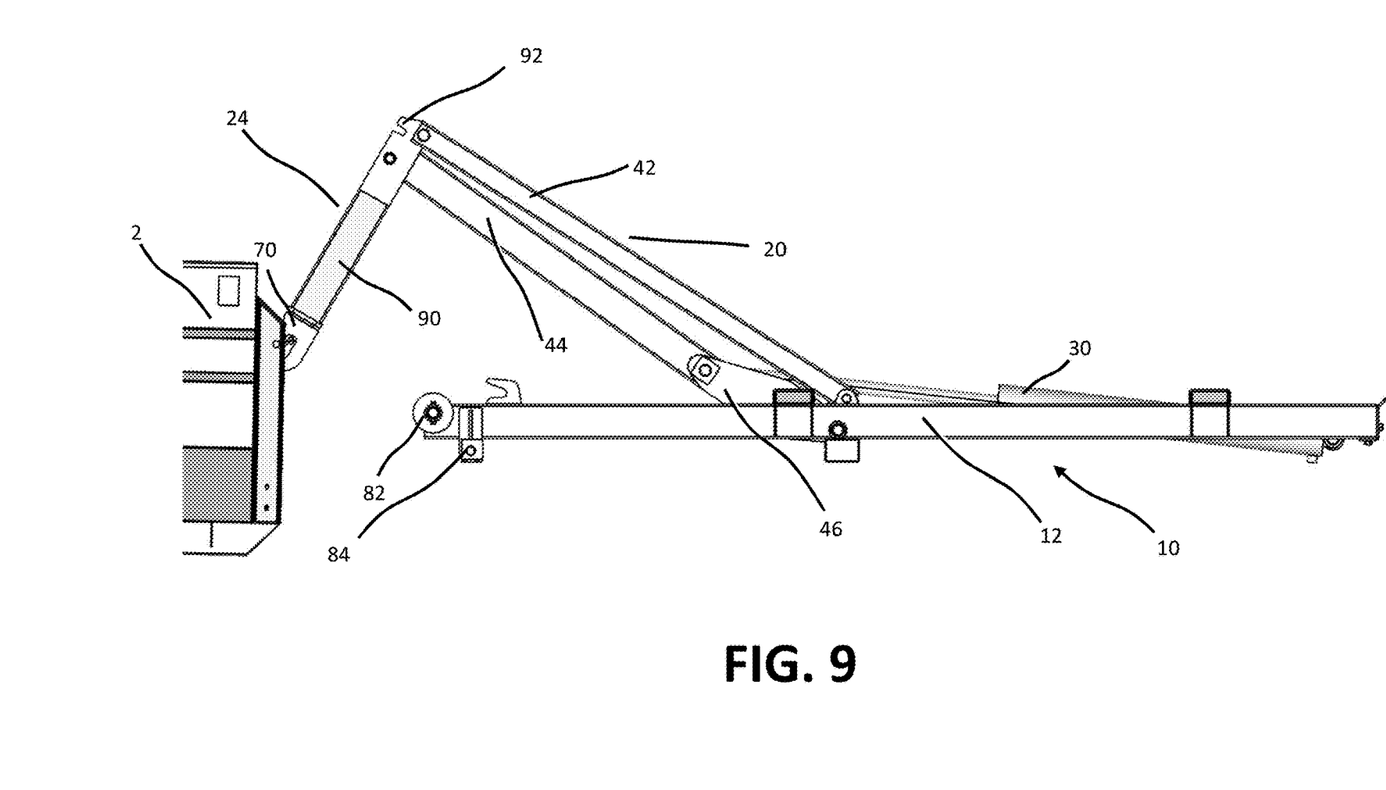
FIG. 9 is an orthographic side view of the hooklift trailer shown in FIG. 1 in a fully extended position.
Figure 10:
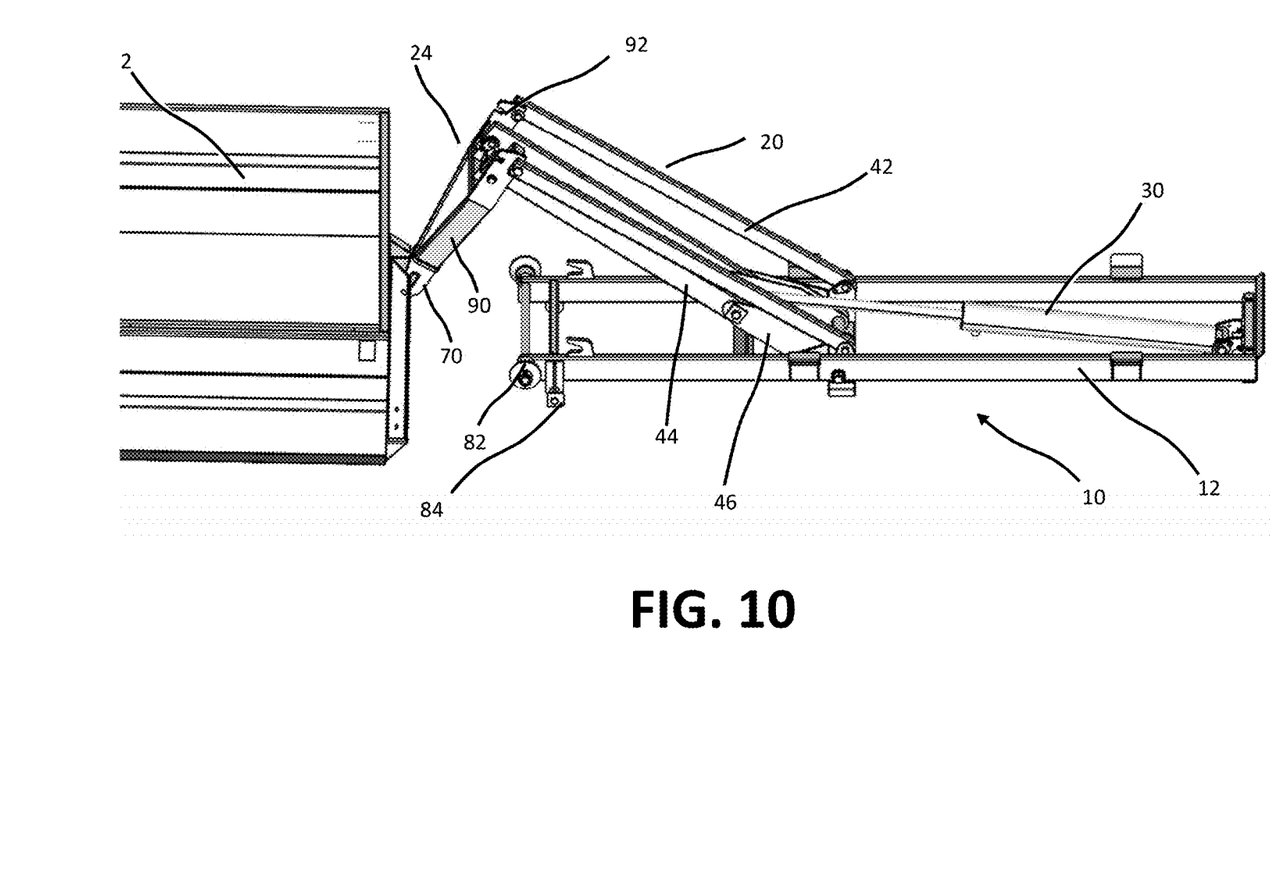
FIG. 10 is a perspective side view of the hooklift trailer shown in FIG. 1 in a fully extended position.

The lift arm 20 may be used for loading and unloading a container 2 or the like as depicted more clearly in FIGS. 7-10. The lift arm 20 may lift any sort of container 2 or the like, including a tilt-frame body, pallet, flat rack, flatbed, bin, dumpster body, and other similar heavy containers. The lift arm 20 may be configured to be in the storage position as shown in FIGS. 1-6, a partially lifted position as shown in FIGS. 7-8, a fully extended position as shown in FIGS. 9-10, or any position in between. The lift arm 20 may comprise a plurality of lift linkages 40 rotatably coupled at one end to the sub-frame 12 and rotatably coupled at the other end to the hook arm 24. The lift arm 20 and the hook arm 24 may be generally L-shaped when viewed from the side as shown particularly in FIG. 3 in the storage position and/or FIG. 9 in the fully extended position.

The plurality of lift linkages 40 may be placed in parallel beside the hydraulic actuator 30. In this aspect described herein, symmetrical lift linkages 40 may be on either side of the hydraulic actuator 30 to balance the load of the container 2 equally on either side of the sub-frame 12. The mirror image lift linkage 40 may operate in an identical manner as the lift linkage 40 described herein. The lift linkages 40 may comprise at least an outer boom 42, an inner boom 44, and a hinge member 46. The inner boom 44 and the outer boom 42 may be generally linear links and the inner boom 44 may be shorter in length than the outer boom 42. In other aspects, the inner boom 44 and outer boom 42 may be nonlinear links in order to accommodate various types of containers 2 and/or to provide additional strength and/or structural support to the linkages 40.

The hinge member 46 may be generally elliptical, diamond-shaped, s-shaped, or kite-shaped in order to provide additional strength and/or may be linear with additional thickness. The hinge member 46 may also have additional hinge members 46 on both sides of the inner boom 44 to provide additional strength and/or load balancing. When placed end to end, the length of the hinge member 46 and the inner boom 44 may be generally equal in length to the outer boom 42. In some aspects, the length of the hinge member 46 and the inner boom 44 may be approximately 5% to 6% longer in length than the length of the outer boom 42. For example, in one aspect the length of the inner boom 44 may be approximately 1675 mm, the outer boom 42 may be approximately 2220 mm, and the hinge member 46 may be approximately 690 mm in length. The inner boom 44 may extend along the hydraulic actuator 30 when the lift arm 20 is placed in the storage position and may be horizontally closer to the hydraulic actuator 30 than the outer boom 42.

For convenience of description, the description below is described with reference to a hinge end for the hinge member 46, the inner boom 44, and the outer boom 42 that indicates the end generally proximate (but not necessarily attached) to a hinge 48. The end opposite the hinged end and generally closer to the hook arm 24 is referred to as the hook end. Although the description herein describes the coupling point as being at an "end", other aspects may have the coupling point along the link and generally proximate to that particular end.

The outer boom 42 may be rotatably coupled at a hinged end 50 to the sub-frame 12 at a hinge 49. The hinge 49 generally holds the hinged end 50 of the outer boom 42 in a fixed position with reference to the sub-frame 12. The hinge 49 may be aligned horizontally with the hinge 48 but vertically spaced above the hinge 48. The hinge 49 may be located approximately 240 mm above hinge 48 in a vertical direction and approximately 200 mm from the hinge 48 in the direction of the hook arm 24 when the hook arm 24 is in the storage position. A hook end 52 of the outer boom 42 may be coupled to the hook arm 24 as further described below.

The hinge member(s) 46 may also be rotatably coupled at a hinged end 54 to the hinge 48. The hinge 48 and hinge 49 may permit the hinge member(s) 46 and the outer boom 42, respectively, to rotate independently with respect to each other. A hook end 56 of the hinged member 46 may be rotatably coupled to a hinge end 58 of the inner boom 44 at another hinge 45. In the storage position, the hinge 45 may be approximately 250 mm higher than hinge 48. The linear distance from the hinge 48 to hinge 45 may approximately be 690 mm. A hook end 60 of the inner boom 44 may be coupled to the hook portion 24 as further described below. In the storage position, the outer boom 42 and inner boom 44 may be generally aligned with the sub-frame 12 with the inner boom 44 being slightly higher in the vertical direction than the outer boom 42.

Turning now to the hook arm 24, the hook arm 24 may comprise a generally triangular frame 90 sharing one side (e.g. cross member 95) with a pair of generally vertical sides 96 extending down from the cross member 95. A container coupling member 70 such as a hook may be provided adjacent a vertex 97 of the triangular frame 90 opposite the cross member 95. The container coupling member 70 may be adapted to releasably couple with the container 2 or the like. The length of the hook arm 24 from the end of the container coupling member 70 to the end of the vertical sides 96 may be approximately 1280 mm. In some aspects, the container coupling member 70 may be a hook, although in other aspects, the coupling member 70 may be any type of coupling mechanism known in the art for coupling or grasping the container 2 by the lift arm 20, such as a magnet to mate with a corresponding opposite polarity magnet on the container. In some aspects, the container coupling member 70 may be removable to enable reconfiguration of the hook arm 24 to enable lifting different types of containers 2.

Figure 11:
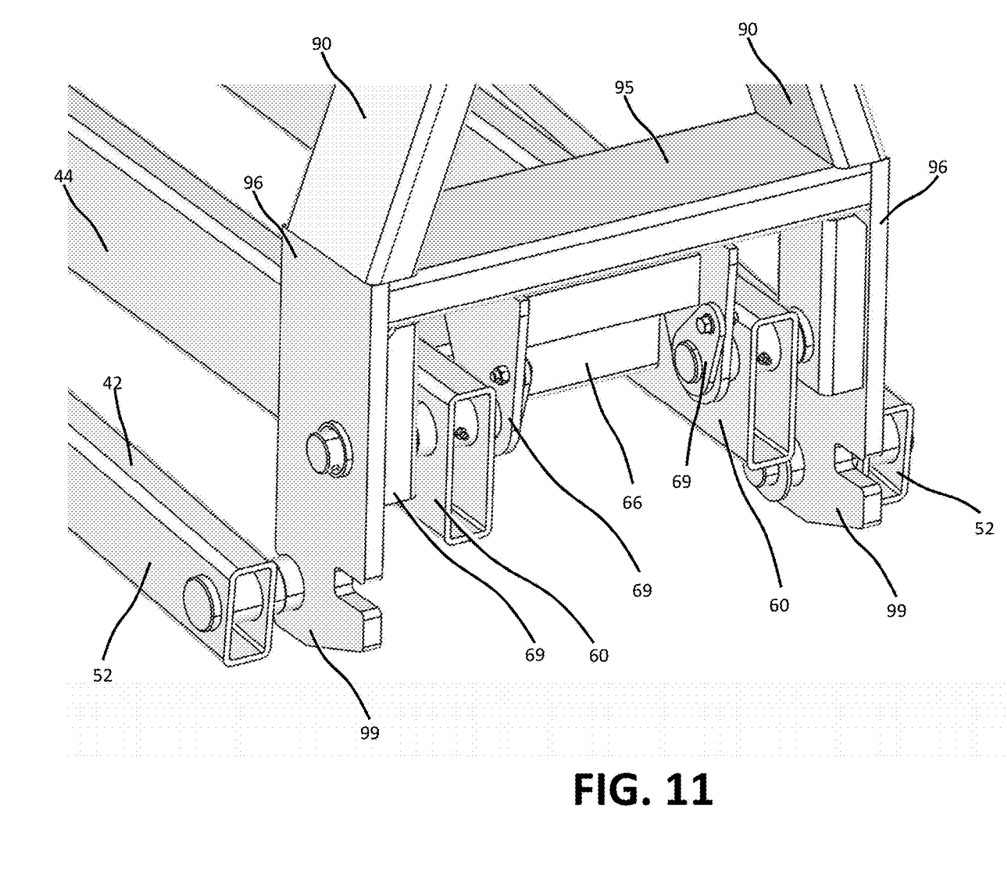
FIG. 11 is an enlarged perspective view of the lift arm connection to the hook arm for the hooklift trailer shown in FIG. 1 in the storage position.

The coupling of the outer booms 42 and the inner booms 44 may be more clearly observed in FIG. 11, the hook ends 52 of the outer booms 42 may be rotatably coupled to the hinge ends 99 of the vertical sides 96 on the exterior side. The hook ends 60 of the inner booms 44 may be rotatably coupled generally central to the vertical sides 96 on the interior side. The hook ends 52 of the outer booms 42 can be coupled to the vertical sides 96 of the hook arm 24 closer to the container coupling member 70 than where the hook ends 52 of the outer booms 42 are coupled. The coupling of the inner booms 44 may be approximately 170 mm higher in the vertical direction than the coupling of the outer booms 42 when the lift arm 20 is in the storage position. The difference in the coupling position and the distance between where the hook ends 52 of the outer booms 42 couple with the vertical sides 96 of the hook arm 24 and where the hook ends 52 of the outer booms 42 couple with the vertical sides 96 of the hook arm 24 contribute to the rotating of the hook arm 24 from being at approximately a 90-degrees angle from the lift arm 20 when the lift arm 20 is in the storage position to less than 90-degrees when the lift arm 20 is positioned substantially vertically. In one aspect, the hook arm 24 may be approximately 30-degrees so the angle of the hook arm 24 may be approximately 70-degrees with respect to the lift arm 20 when the lift arm 20 is in a 90-degree configuration as demonstrated in FIG. 8. This angle reduces the load angle of the container 2 to approximately 30-degrees facilitating loading and/or unloading of the container 2 with minimal disturbing of the contents in the container 2. The coupling between the inner booms 44 and the short sides 96 may additionally be spaced and/or strengthened using other structural members 69.

As depicted more clearly in FIGS. 7-10, the hinge member 46 may allow the hinge end 58 of the inner boom 44 to rotate about the hinge 48 with the length of the hinge member 46 determining a radius of an arc that hinge end 58 follows. In this manner, the outer boom 42, inner boom 44, hinge member 46, and the length of the short side 96 of the rectangular frame 92 between where the hook ends 52 of the outer booms 42 rotatably connect to the short sides 96 and the hook ends 60 of the inner boom 44 rotatably connected to the short sides 96 form a planar five-bar, two-degree of freedom linkage having two pivot joints (e.g. hinges 48 and 49) fixed and offset from each other.

The lift arm 20 may be powered by a hydraulic system (not shown) comprising a hydraulic actuator 30. In this aspect, the hydraulic actuator 30 may be a hydraulic cylinder. A hydraulic actuator 30 may be used to pivot the lift arm 20 into the lift position where the hook arm 24 may be moved toward the back of the trailer bed 14. The container 2 or the like may be engaged with the container coupling member 70. The hydraulic actuator 30 may then be retracted to pivot the lift arm 20 into the storage position where the hook arm 24 may be moved toward the front of the trailer bed 14, thus pulling the container 2 or the like onto the trailer frame 14.

The hydraulic actuator 30 may be a conventional hydraulic cylinder having a rod coupled to a piston within a barrel. An electrical actuator (not shown) may cause a hydraulic fluid to enter or be released from the barrel at one or both ends. The hydraulic actuator 30 may be disposed between the generally parallel lift linkages 40. In this aspect, the rod end of the hydraulic cylinder may be operatively connected (e.g. by way of a cross member 47 between the two hinge members 46 of each lift linkage 40) to the hinge members 46 at the hook end 56 such that when fluid enters the barrel, the piston drives the rod linearly to rotate the hook end 56 of the hinge members 46 around the hinge 48. The hook end 56 of the hinge members 46 may rotate toward the rear end of the trailer frame 14. The barrel end of the hydraulic cylinder 30 may be anchored to the trailer frame 14 enabling the hydraulic cylinder 30 to rotate the lift arm 20 or the entire hooklift assembly 10.

The rotational motion of the hinge members 46 may cause the hinge members 46 to exert a force on the hinge end 58 to the inner booms 44. This force may be translated through the inner booms 44 resulting in a rotational lifting motion of the hook portion 24 pulling the hook portion 24 up and over the trailer frame 14 and towards the rear of the trailer frame 14. The outer booms 42 may then rotate about the hinge 49 as a result of the rotational lifting motion. The hinge members 46 may rotate to contact an inner mechanical stop 34 between the two sides of the sub-frame 12. The hinge members 46 may rotate so that the lift arm 20 may be between approximately 140-degrees to 150-degrees with respect to the trailer frame 14 as shown in FIGS. 9 and 10.

With reference to FIGS. 7-9, the hook arm 24 may be pivotally connected to the hook ends 60 of the inner boom 44, but the hook portion 24 may also pivotally connect on the short sides 96 to the hook end 52 of the outer boom 42 as previously described above. In this manner, as the lift arm 20 moves towards the vertical position demonstrated in FIG. 8, the length of the inner boom 44 and the hinge member 46 with respect to the outer boom 42 decreases as shown in FIGS. 7 and 8. Because the hinge 49 connected to the hinged end 50 of the outer boom 42 is horizontally aligned but vertically spaced above the hinge 48 the hinged end 54 of the hinge member 46, when the lift arm 20 is positioned horizontally in the storage position, the horizontal length of the outer boom 42 is approximately the same distance as the horizontal length of the hinge members 42 and the inner boom 44. However, as the lift arm 20 pivots upwards towards vertical, the vertical spacing between the hinge 48 and the hinge 49 will effectively increase the effective length of the outer boom 42 relative to the inner boom 44 and the hinge member 46. This increase to the effective length of the outer boom 42 will be approximately the vertical spacing between the hinge 48 and hinge 49 when the lift arm 20 is positioned substantially vertical. This increase in relative length of the outer boom 42 relative to the inner boom 44 and the hinge member 46 results in the a reduction in the angle of the hook arm 24 with respect to the lift arm 20 because the position of the hook ends 52 of the outer booms 42 where they are coupled to the vertical sides 96 of the hook arm 24 will be higher than the position of the hook ends 52 of the outer booms 42 where they are coupled to the vertical sides 96 of the hook arm 24. This will angle the hook arm 24 downwards as the hook arm 24 extends towards the container coupling member 70. The reduction may reduce the angle from approximately 90-degrees when in the storage position to less than 90-degrees when the lift arm 20 is generally perpendicular with respect to the trailer frame 14. In one aspect, the angle of the hook arm 24 relative to the lift arm 20 may be approximately 70-degrees when the lift arm 20 is generally perpendicular with respect to the trailer frame 14. Once the lift arm 20 passes approximately 90-degrees, the combined length of the inner boom 44 and the hinge member 46 with respect to the outer boom 42 increases back towards approximately 90-degrees. The fixed length of the outer boom 42 may prevent hinge end 99 of the hook arm 24 from moving as far rearward as the hook end 60 of the inner boom 44. In this way, the hydraulic cylinder 30 may be used to extend and retract the lift arm 20.

The motion of the hook arm 24 and the lift arm 20 may keep the load angle at less than 30-degrees and may reduce the requirement for a separate or additional hydraulic cylinder 30 to reduce the load angle. In some aspects, smaller load angles may be more suitable for easily spilled loads, such as for example between approximately 5 and approximately 30 degrees. In this manner, the use of one hydraulic actuator 30 may allow for a single motion that combines both the required rotational motion and load angle minimization while reducing the weight of the lift arm 20 and the hook arm 24.

In some aspects more clearly demonstrated in FIG. 6, the inner booms 44 may additionally comprise a gusset 36 at the hinge end 58 that extends towards the hinges 48 for structural purposes.

When the hooklift assembly 10 is in a lift position shown in FIG. 9-10 with the lift arm 20 extending behind the trailer frame 14, the container coupling member 70 disposed at hook end 98 of the hook portion 24 may be positioned behind the trailer frame 14. From this position, the container coupling member 70 may be maneuvered to engage and couple with a container 2. When the lift arm 20 is coupled to a container 2 via the container coupling member 70, the hydraulic actuator 30 may be retracted and thus causes the lift arm 20 to rotate towards the front of the trailer frame 14. The retracting actuator 30 may rotate the hinge members 46 around a first pivot axis so that the hook end 56 of the hinge member 46 may rotate back towards the front of the trailer frame 14. The hinge end 58 of the inner booms 44 may be connected to the hook ends 56 of the hinge members 46 at a second pivot axis and this may cause the inner booms 44 to pull the hook arm 24 back towards the front of the trailer frame 14. As the inner booms 44 rotate around the second pivot axis which rotates in turn around the first pivot axis, the outer booms 42 may also rotate around their hinge ends 50 of the outer booms 42. The difference in the points of connection of the inner booms 44 and the hook portion 24 and the outer booms 42 and the hook portion 24 may cause the hook arm 24 to pivot relative to the inner booms 44 and the outer booms 42. In one aspect, the hook portion 24 may be pivoted substantially perpendicular when the inner booms 44 and the outer booms 42 may be pivoted fully forward relative to the trailer frame 14. This motion of the lift arms 20 may pull the container 2 onto the trailer frame 14.

In some aspects, the container 2 may be pulled on the trailer frame 14 with the assistance of guide rollers 82. Guide rollers 82 may be rotatably mounted on at least the rear of the trailer frame 14 or the hooklift sub-frame 12 to facilitate loading and unloading of the container 2 or the like therefrom. The guide rollers 82 may support and guide the container 2 as it is loaded or unloaded from the hooklift assembly 10 by the lift arm 20. In the fully retracted or loading position, the container 2 may be pulled up fully onto the trailer frame 14 for transport.

Controls to operate the cylinder 30 may be located in-cab of a vehicle to which the trailer assembly 10 may be connected. The in-cab controls may be controls operated manually or automatically, and may be pneumatic, wireless, or electric controls.

In some aspects, the hook arm 24 may be provided with a jib (not shown) that may drive the container coupling member 70 and may balance the load for easy transport. The jib may be sliding or articulating. In some aspects, the jib may be slidably moveable in relation to the rest of the lift arm 20 such as through telescopingly engageable members (not shown).

In some aspects, the inner booms 44 may be additionally coupled together using a cross-member 66 located proximate the hook ends 60.

Generally in use, the lift arm 20 may be pivotable between a retracted position and an extended position. The lift arm 20 may be rotated and pivoted out of the retracted position to load and unload a container 2 in the extended position. An operator may lower the lift arm 20, engage the container 2 to be hoisted with the container coupling member 70, and then activate the hydraulic actuator 30 to pull the container 2 onto the trailer frame 14 and lock it into position.

At the initiation of the loading cycle, the hooklift arm 20 may be supported on the hooklift frame 12. The hydraulic actuator 30 may be retracted so that the hook arm 24 may be adjacent a forward end of the trailer frame 14. From this transport position, the hook arm 24 may be moved upward by extension of the hydraulic actuator 30 until the lift arm 20 is in a vertical position and the angle between the hook arm 24 and the lift arm 20 reaches a minimum angle. As the hydraulic actuator 30 is extended further, the angle between the hook arm 24 and the lift arm 20 increases so that the hook arm 24 and the container coupling member 70 may be extended outwards behind the trailer frame 14. At full extension of the hydraulic actuator 30, the container coupling member 70 may be positioned in a position for engagement with a container 2 to be loaded on the trailer frame 14. Upon engagement of the container 2 with the container coupling member 70, the hydraulic actuator 30 may be retracted to pivot the lift arm 20 upwardly and forwardly, raising the forward end of the container 2 off the ground and drawing the container 2 closer to the trailer frame 14. Again, when the lift arm 20 reaches a vertical orientation, the angle between the hook arm 24 and the lift arm 20 reaches the minimum angle. Continued retraction of the hydraulic actuator 30 may raise the forward end portion of the container 2 above the rearward end portion of the trailer frame 14 whereupon the bottom of the container 2 may be brought into contact with the rollers 82. The rollers 82 may decrease the force required to drag the container 2 onto the trailer frame 14 and may keep the container 2 centered relative to the trailer frame 14. Full retraction of the hydraulic actuator 30 may bring the hooklift arm 20 to the same, earlier described position where the hooklift arm 20 and the container 2 may be supported on the trailer frame 14. This sequence may be reversed to unload the container 2 that has been loaded onto the trailer frame 14. In some aspects, the sub-frame 12 may comprise coupling brackets that may be used to further secure the container 2 to the sub-frame 12 and trailer 14.

Since the inner booms 44 may connect higher up or in a more inward position on the hooklift sub-frame 12 than the outer booms 42 and because of the use of the hinge coupling members 46, the hooklift assembly 10 may unfold when the lift arm 20 moves backwards to pick up or unload an attachment or container. This configuration may keep the load angle at a minimum and eliminate the need for a separate or additional hydraulic cylinder to reduce the load angle. The size of the hooklift assembly 10 may be reduced by using a single hydraulic actuator, thus lessening the weight of the hooklift assembly 10 and saving on material costs and energy costs in operating the hooklift assembly 10. The decrease in the weight of the hooklift assembly 10 may also allow an increase of the weight of the payload carried by the trailer frame 14. Furthermore, as the hooklift assembly 10 may be mounted on the trailer frame 14, a dedicated truck specifically developed for hooklift use may not be required, allowing for increased flexibility.

Although the aspects described herein may describe a planar five-bar, two-degree of freedom linkage having one pivot joint fixed at the hinge 48, alternative aspects may have the outer boom 42 and the hinge member 46 rotatably coupled to the sub-frame 12 at different points than those depicted herein.

Although the aspects described herein may refer to a pair of lift linkages 40, other aspects may have only one lift linkage 40 or additional lift linkages 40. The number of lift linkages 40 may be determined based on the mass of the container 2 and/or contents. As the mass of the container 2 and/or contents increases, the number of lift linkages 40 may be increased.

Although particular dimensions are described herein, these dimensions are intended to be descriptive and not limiting. Other dimensions of the components may be used.

Although the aspects described herein may describe a separate hooklift sub-frame 12 and trailer frame 14, other aspects may integrate the hooklift sub-frame 12 and the trailer frame 14 to be a single support frame for the lift arm 20 and hook arm 24. In other aspects, the trailer frame 14 may not be present. In even other aspects, the hooklift sub-frame 12 may be placed in a fixed location and not on a movable transport.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. A hooklift assembly comprising:
   a frame;
   a lift arm comprising a lift linkage, the lift linkage rotatably mounted at a hinge end to at least one position on the frame; the lift linkage comprising an outer boom, an inner boom, and at least one hinge member;
   a hook arm rotatably coupled at a hook end of the lift arm, the hook arm configured for loading or unloading a container from the frame; and
   a hydraulic actuator coupled at one end to the frame and at the other end to the lift linkage, the hydraulic actuator simultaneously lifting the lift linkage from a storage position into an extended position and adjusting an angle between the hook arm and the lift linkage.

2. The hooklift assembly according to claim 1, wherein the outer boom and inner boom are parallel linear links.

3. The hooklift assembly according to claim 2, wherein the outer boom is rotatably coupled to the frame at a hinge end of the outer boom using a first hinge.

4. The hooklift assembly according to claim 3, wherein the hinge member is rotatably coupled at a hinge end to the frame using a second hinge and the hinge member is rotatably coupled at a hook end to a hinge end of the inner boom.

5. The hooklift assembly according to claim 4, wherein the first hinge is space vertically above the second hinge.

6. The hooklift assembly according to claim 5, wherein the first hinge is horizontally aligned with the second hinge.

7. The hooklift assembly according to claim 5, wherein a container coupling member is provided on an end of the hook arm configured attach to the container.

8. The hooklift assembly according to claim 7, wherein a hook end of the outer boom is rotatably coupled to the hook arm and a hook end of the inner boom is rotatably coupled to the hook arm closer to a container coupling member than the hook end of the outer boom.

9. The hooklift assembly according to claim 4, wherein the outer boom is longer than the inner boom.

10. The hooklift assembly according to claim 9, wherein a combined length of the hinge member and the inner boom is approximately equal to the outer boom length.

11. The hooklift assembly according to claim 10, wherein the angle between the hook arm and the lift linkage reaches a minimum angle when the lift linkage is perpendicular to the frame.

12. The hooklift assembly according to claim 11, wherein the minimum angle is approximately 70-degrees.

13. The hooklift assembly according to claim 11, wherein the angle between the hook arm and the lift linkage ranges between 70-degrees to 90-degrees.

14. The hooklift assembly according to claim 1, wherein the angle between the hook arm and the lift linkage determines a maximum load angle for the container.

15. The hooklift assembly according to claim 14, wherein the maximum load angle is between 5-degrees and 30-degrees from the frame.

16. The hooklift assembly according to claim 1, wherein a shape of the hinge member is selected from one of elliptical, diamond-shaped, kite-shaped, s-shaped, and a combination thereof.

17. The hooklift assembly according to claim 1, wherein the hook end comprises a container coupling member, the container coupling member configured for coupling to the container.

18. The hooklift assembly according to claim 1, wherein the hook arm comprises a rectangular-shaped frame rotatably coupled to the hook end of the outer boom and the hook end of the inner boom.

19. The hooklift assembly according to claim 18, wherein the hook arm further comprises a triangular frame coupled to the rectangular-shaped frame, wherein one side of the triangular frame shares at least a portion of one side of the rectangular-shaped frame.

20. The hooklift assembly according to claim 19, wherein the container coupling member is located on a vertex of the triangular frame.

21. The hooklift assembly according to claim 1, further comprising at least two lift linkages, the at least two lift linkages further comprising a cross member coupled between the hinge members from each of the at least two lift linkages.

22. The hooklift assembly according to claim 21, wherein the hydraulic actuator is coupled at the other end to the cross member of the at least two lift linkages in order to rotate the hinge members of the at least two lift linkages.

23. The hooklift assembly according to claim 1, further comprising at least one guide roller rotatably mounted on at least a rear of the trailer frame.

24. A hooklift assembly comprising:
a frame;
a lift arm comprising a lift linkage, the lift linkage rotatably mounted at a hinge end to at least one position on the frame;
a hook arm rotatably coupled at a hook end of the lift arm, the hook arm configured for loading or unloading a container from the frame;
a hydraulic actuator coupled at one end to the frame and at the other end to the lift linkage, the hydraulic actuator simultaneously lifting the lift linkage from a storage position into an extended position and adjusting an angle between the hook arm and the lift linkage; and
wherein the angle between the hook arm and the lift linkage determines a maximum load angle for the container.

* * * * *